US012701061B2

(12) United States Patent
Moore

(10) Patent No.: US 12,701,061 B2
(45) Date of Patent: Aug. 4, 2026

(54) ITERATIVE BUILDING OF INCOMPLETE COMMAND STRUCTURES IN A FIXED-SIZE COMMUNICATION REGIME

(71) Applicant: SpiderOak, Inc., Lenexa, KS (US)

(72) Inventor: Jonathan Andrew Crockett Moore, Portland, OR (US)

(73) Assignee: SpiderOak, Inc., Lenexa, KS (US)

( * ) Notice: Subject to any disclaimer, the term of this patent is extended or adjusted under 35 U.S.C. 154(b) by 337 days.

(21) Appl. No.: 18/515,026

(22) Filed: Nov. 20, 2023

(65) Prior Publication Data

US 2025/0168089 A1     May 22, 2025

(51) Int. Cl.
*H04L 43/045*     (2022.01)
*G06F 9/46*     (2006.01)
*G06F 9/48*     (2006.01)
*G06F 9/52*     (2006.01)
*H04L 43/024*     (2022.01)

(52) U.S. Cl.
CPC ............ *H04L 43/045* (2013.01); *G06F 9/466* (2013.01); *G06F 9/4887* (2013.01); *G06F 9/522* (2013.01); *H04L 43/024* (2013.01)

(58) Field of Classification Search
CPC ..... H04L 43/045; H04L 43/024; G06F 9/466; G06F 9/4887; G06F 9/522; G06F 16/9024
See application file for complete search history.

(56) References Cited

U.S. PATENT DOCUMENTS

| | | | | |
|---|---|---|---|---|
| 6,199,107 B1 * | 3/2001 | Dujari | ................. | G06F 16/9574 |
| | | | | 709/219 |
| 6,212,649 B1 * | 4/2001 | Yalowitz | ............. | G06F 11/1479 |
| | | | | 709/201 |
| 2015/0379062 A1 * | 12/2015 | Vermeulen | .......... | G06F 16/2358 |
| | | | | 707/691 |
| 2023/0370522 A1 * | 11/2023 | Wang | .................. | G06F 16/9024 |

* cited by examiner

*Primary Examiner* — Jorge A Chu Joy-Davila
(74) *Attorney, Agent, or Firm* — Perkins Coie LLP

(57) ABSTRACT

Systems and methods for completing command graphs based on sampling of known commands are disclosed herein. The system can obtain a sample algorithm for selecting sampled commands from a set of known commands. The system can determine a set of sampled commands based on the sampling algorithm. The system can transmit a first request for completing a command graph. The system can receive a second command based on the first request. The system can append the second command to the command graph.

20 Claims, 7 Drawing Sheets

200

| Command ID 202 | Parent/Child Relationships 204 | |
|---|---|---|
| Command 1 | Child Command(s) | Command 2 |
| | | Command 3 |
| Command 2 | Parent Command(s) | Command 1 |
| | Child Command(s) | Command 4 |
| Command 4 | Parent Command(s) | Command 2 |
| | | Command 3 |
| | Child Command(s) | Command 6 |

206 —

208 —

210 —

600

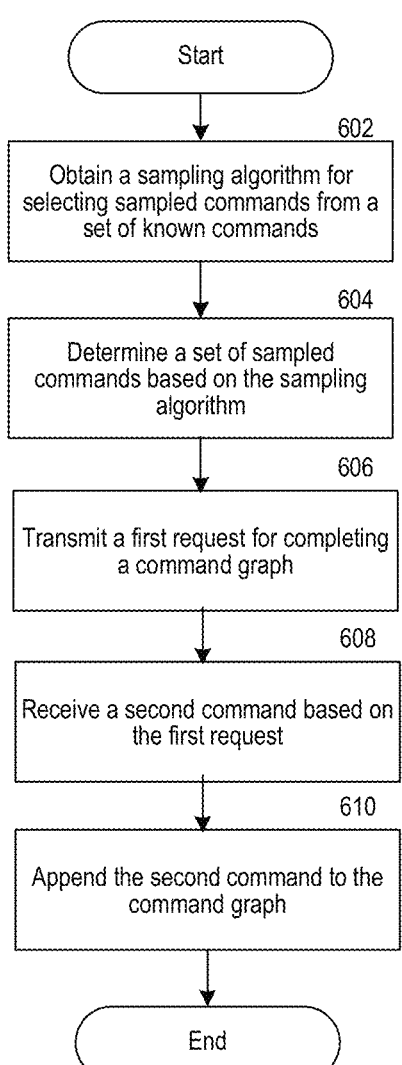

```
        ┌─────────────┐
        │    Start    │
        └─────────────┘
               │
               ▼           602
┌──────────────────────────────┐
│  Obtain a sampling algorithm  │
│  for selecting sampled        │
│  commands from a set of       │
│  known commands               │
└──────────────────────────────┘
               │
               ▼           604
┌──────────────────────────────┐
│  Determine a set of sampled   │
│  commands based on the        │
│  sampling algorithm           │
└──────────────────────────────┘
               │
               ▼           606
┌──────────────────────────────┐
│  Transmit a first request for │
│  completing a command graph   │
└──────────────────────────────┘
               │
               ▼           608
┌──────────────────────────────┐
│  Receive a second command     │
│  based on the first request   │
└──────────────────────────────┘
               │
               ▼           610
┌──────────────────────────────┐
│  Append the second command    │
│  to the command graph         │
└──────────────────────────────┘
               │
               ▼
        ┌─────────────┐
        │     End     │
        └─────────────┘
```

*FIG. 6*

ITERATIVE BUILDING OF INCOMPLETE COMMAND STRUCTURES IN A FIXED-SIZE COMMUNICATION REGIME

RELATED APPLICATIONS

This patent application is related to U.S. Non-Provisional patent application Ser. No. 18/355,981, entitled "Ordering Multiple Commands Issued By Multiple Computing Devices in a Network, When Chronological Ordering Is Not Possible," by inventor Jonathan Moore, filed on Jul. 20, 2023, and U.S. Non-Provisional patent application Ser. No. 18/356,001, entitled "Fixing a Changing Weave Using a Finalize Node," by inventor Jonathan Moore, filed on Jul. 20, 2023, each of which applications are hereby incorporated by reference herein in their entirety.

BACKGROUND

Communication among multiple network devices may be constrained due to available bandwidth, available storage, or restrictions due to communication standards. As such, devices that are part of a network may possess incomplete information relating to communications, commands, or system actions. In some implementations, a network device may lack information relating to a command issued in another subnetwork or by another device, if communication between the associated devices fails. Additionally or alternatively, even if communication between devices is uninhibited, previously received information relating to commands, actions, or communications may be lost due to data corruption, memory loss, or hardware failure. As such, such networks have difficulty in maintaining updated records of network actions in a robust manner.

BRIEF DESCRIPTION OF THE DRAWINGS

Detailed descriptions of implementations of the present invention will be described and explained through the use of the accompanying drawings.

FIG. 6 shows a flowchart of a method to iteratively complete command graphs based on stochastic sampling of known commands, in accordance with one or more implementations.

Figure 1:
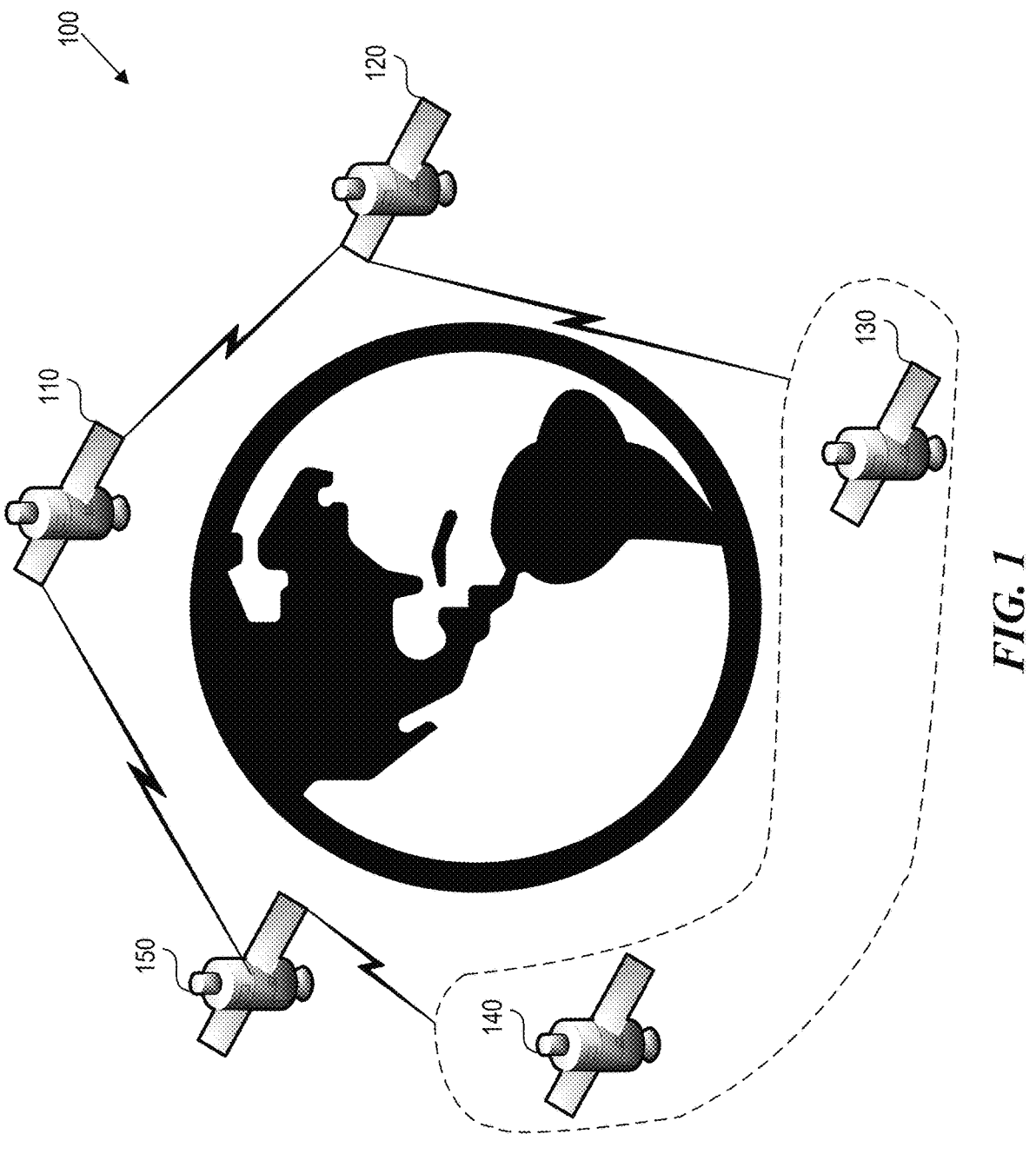
FIG. 1 shows an overview of a network made up of nodes that can fail to communicate or store information with other nodes, in accordance with one or more implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The methods and systems disclosed herein enable iterative completion of representations of network-wide information based on sampling information known to a given device. For example, actions or commands that are universal or relevant to multiple nodes within a network can be represented by graphs that are each stored independently in these interconnected nodes. The system can generate a request to another node for information that aids in the completion of graphs of commands based on providing a sample of known information to the other node. Thus, the system can receive information in response to this request relating to other actions or commands that are known to the other node based on the provided sample. As such, in order to maintain information consistent across nodes, the disclosed system enables such information to be synchronized between devices within the network.

For example, the system can sample commands or other information known to a first node, where some commands are sampled more heavily than other commands. The system enables the first node to transmit a request for synchronization to a second node by including indications of these sampled commands within the request. In response, the system may receive indications of other commands associated with the sampled commands from a second node, such as child commands of the sampled commands. In some implementations, such communications can be of a fixed size, thereby enabling efficient, standardized communications in situations where transmissions may be unreliable or limited in bandwidth, for example. By receiving commands that are known to a second node, the first node can fill in gaps in knowledge of commands by communicating with the second node. Thus, in communicating with other nodes in the network, each node can synchronize command graphs across a network incrementally, thereby enabling continuous updating of information and consistency across the network of nodes.

As an illustrative example, the systems and methods disclosed herein enable improvements in efficiency, reliability, and robustness of information and information transfer across network devices. The system may mitigate communication or data storage failures that may afflict conventional networks. For example, by transmitting and/or receiving fixed-size messages that communicate known commands, the system mitigates unsatisfactory bandwidth or information transmission that may be limited or unreliable. Furthermore, known commands that are sampled and transmitted to other nodes can be stochastically or probabilistically determined. For example, commands that are at the end of a chain of commands (e.g., head commands) or commands upon which multiple commands depend (e.g., branch commands) can be sampled more heavily than other commands. By doing so, the system enables a first node to provide commands that are more likely to be linked to unknown commands, such as those that depend on branch commands or those that have been newly created.

Furthermore, by sampling commands probabilistically, even commands that may be unlikely to be associated with unknown commands may be queried, such that any previously known commands that have been lost may be recovered. To illustrate, a first node may possess information about a first command, where this command is a parent to two child commands. Due to data storage issues such as a storage failure or damage, information relating to one of the child commands may be lost. As such, the first node may not characterize the first command as a branch command. However, the system may sample this first command stochastically, and query a second node on the basis of this first command. In response, the second command may send information relating to the lost child command, thereby enabling the first node to recover this information. As such, the system enables both updating and recovery of commands in a command graph over time, based on querying other nodes that store other versions of the command graph. Furthermore, by structuring and organizing these known commands and updating them according to other nodes, the system stores information in a consistent manner across devices or nodes within the network, building in robustness and reliability in information storage in a way that does not depend on the condition of any single network device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples. Synchronization of Graphs of Commands Issued by Multiple Computing Devices in a Network FIG. 1 shows an overview of a network made up of nodes that can fail to communicate or store information with other nodes, in accordance with one or more implementations. The disclosed system includes a cryptographic protocol where cryptographic commands can be issued by nodes independently and can include communication between nodes. Such cryptographic commands can relate to each other in a manner that is recorded by a command graph. For example, two commands can depend on a first command, which can be represented as two child commands linked to a single parent command.

The disclosed system 100 allows for continued operation of all network devices 110, 120, 130, 140, 150 during a network partition where a network of nodes is split into at least two groups of nodes that cannot communicate with each other. For example, the network devices 130, 140 can be cut off from the rest of the network devices 110, 120, 150, however each set of network devices 130, 140 and 110, 120, 150 can continue to function independently, issuing commands that can be recorded in a graph, as described in this application, until the full network is restored. Additionally or alternatively, some nodes may be temporarily unavailable, isolated, or damaged and, as such, can lose information relating to previously known commands issued by itself or other nodes within the network. The network can be centralized, with entities responsible for administrative or organizational tasks. Alternatively or additionally, the network can be decentralized, such as a blockchain- or cryptography-based network.

The disclosed system enables recovery or updating of network commands in such situations by enabling systems to query other nodes for commands that may or may not be already known. The system 100 always ensures availability to the nodes that can communicate with each other and provides global consistency when possible. Continued operation is allowed regardless of the size and number of partitions. For example, nodes with incomplete information relating to commands issued within the network can continually receive updates from other nodes, even if these communications are inconsistent, lost, or limited in bandwidth.

Figure 7:
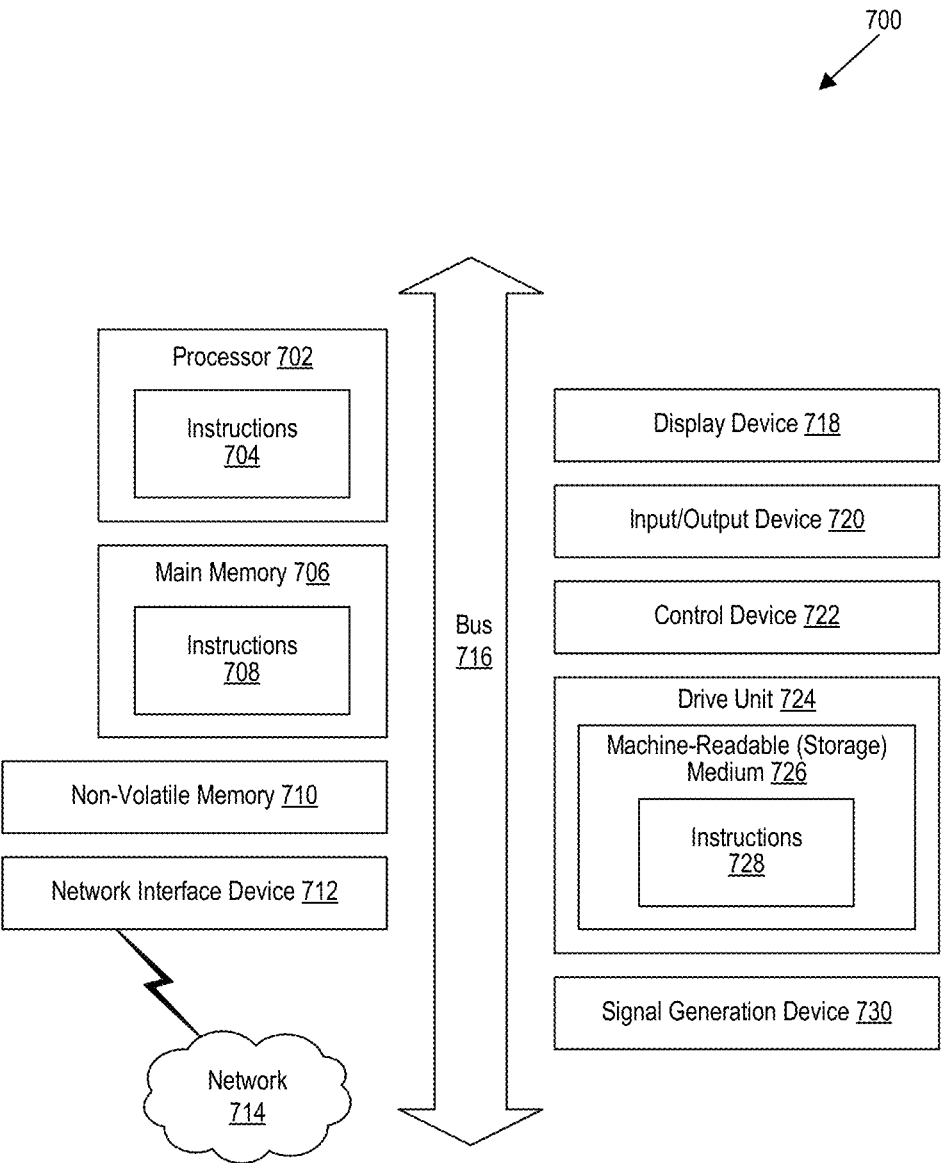
FIG. 7 is a block diagram that illustrates an example of a computer system in which at least some operations described herein can be implemented.

For example, nodes can include computing devices with computer systems, such as those described in relation to FIG. 7. Nodes can include processors, communication devices, and/or storage media, and can issue, execute, receive, or generate commands. For example, a node includes a computing device or a computer configured to communicate with a blockchain or devices associated with a cloud computing server. In some implementations, a node can include a blockchain node, which may include a computing device that is integrated with or can communicate with other devices associated with a blockchain. Blockchain nodes can maintain consensus of a blockchain's ledger, and, in some cases, can validate blockchain transactions within a blockchain (e.g., through validation of cryptographic problems, such as proof-of-work problems).

In some implementations, nodes are configured to communicate with each other. For example, nodes can transmit commands or indications of commands to other nodes within a decentralized network. Communications between nodes may be limited by bandwidth or by other imposed requirements. In some implementations, the disclosed system 100 enables nodes to send fixed-sized messages. A fixed-size message can include a message with a fixed structure, file size (e.g., as expressed in bytes), or number of elements. As an illustrative example, a fixed-size message includes a set number of command identifiers, as well as indications of a predetermined number of parent and/or child commands associated with each command. By sending and receiving fixed-sized messages, the system ensures that communications are standardized and of a reasonable size such that, in the event of communication failures, communications are still able to arrive at intended destinations. Furthermore, even if parts of the message are not communicated (e.g., due to dynamic network failures), the standardized nature of the fixed-size message enables even partial data to be recovered from the message.

Figure 2:
FIG. 2 shows a sample data structure representing a command graph, including head, branch, or merge commands, in accordance with one or more implementations.

FIG. 2 shows a sample data structure representing a command graph, including head, branch, or merge commands, in accordance with one or more implementations. The system 100 can include the data structure 200, representing a command graph stored within a first node (e.g., the network device 110). The data structure 200 can include information relating to known commands, identified by command identifiers 202. Additionally or alternatively, the data structure 200, representing a command graph, can include information relating to parent-child relationships 204 between known commands. To illustrate, the data structure 200 can include information relating to known commands 206, 208, or 210, including their respective command identifiers, indications of their parent commands, and indications of their respective child commands.

In disclosed implementations, a command can include tasks, processes, or transactions. For example, a command includes a blockchain transaction validation event and/or the subsequent blockchain transaction. A command can include a message or another transmission from a first node to a second node in the network. In some implementations, a command includes a system security-related event, such as an authentication request or an authentication-related task. Furthermore, as described below, commands can depend on one or more parent commands and/or spawn one or more child commands. Commands can be known to some nodes and unknown to other nodes. For example, a blockchain transaction associated with a first user communicating with a first node and a second node communicating with a second user can be known to both the first node and the second node, but not to a third node unrelated to the communication. However, the transaction may concern resources or information associated with the whole network (e.g., as in a blockchain network). As such, the third node can benefit from receiving information relating to the blockchain transaction. As such, commands executed in one part of the network or by a given node may be relevant to nodes within other parts of the network. In other words, knowledge of commands can be relevant network-wide-thus, synchronization of events across various devices within the network can, in some cases, be useful or necessary for effective network operation.

Commands can be associated with command identifiers (e.g., command identifiers 202 in FIG. 2), such as to track or encapsulate knowledge of given commands. For example, a command can include a cryptographic representation (e.g., a hash) of a hexadecimal number that uniquely identifies a command (e.g., a representation generated by a public-private key pair or an encryption algorithm). The command identifiers can be stored in the data structure 200 to maintain information relating to the structure of known commands, such as through identification of associated parent or child commands. In some implementations, commands are associated with labels that indicate a sequential position of commands known to a given node (e.g., through a serial number). In some implementations, information relating to known commands, such as commands recorded within the data structure 200, can be stored within a storage disk or another type of storage media. Commands known to a given node (e.g., commands within the data structure 200) can be stored within the storage disk according to an order determined by labels that indicate sequential positions of the known commands. By doing so, the system can improve storage and recall of information associated with known commands.

Commands can be of various types determined by their relationship to other commands. For example, a command can be a parent command to a child command. As an illustrative example, a parent-child relationship can include an indication that a first command depends on a second command, where the first command is a child command and the second command is a parent command. A child command may include a script, program, or task that includes information from, and processed after, another command, which can be identified as a parent command. In some implementations, a single parent command can have multiple child commands, in which case the parent command may be referred to as a command of a "branch type" (e.g., a branch command). For example, the data structure 200 represents Command 1, indicated by the known command 206, as including two child commands, Command 2 and/or Command 3. Additionally or alternatively, a single child command can be associated with multiple parent commands, in which case the child command may be referred to as a "merge command." For example, Command 4, represented by the known command 210, can be derived from (e.g., use information within) both Command 2 and Command 3 and, thus, can be considered to be a merge command. In some embodiments, a given command is not associated with any child commands, in which case the command may be referred to as a "head" command. Commands can include labels that indicate their sequential position within the data structure 200 and the corresponding command graph.

Figure 3A:
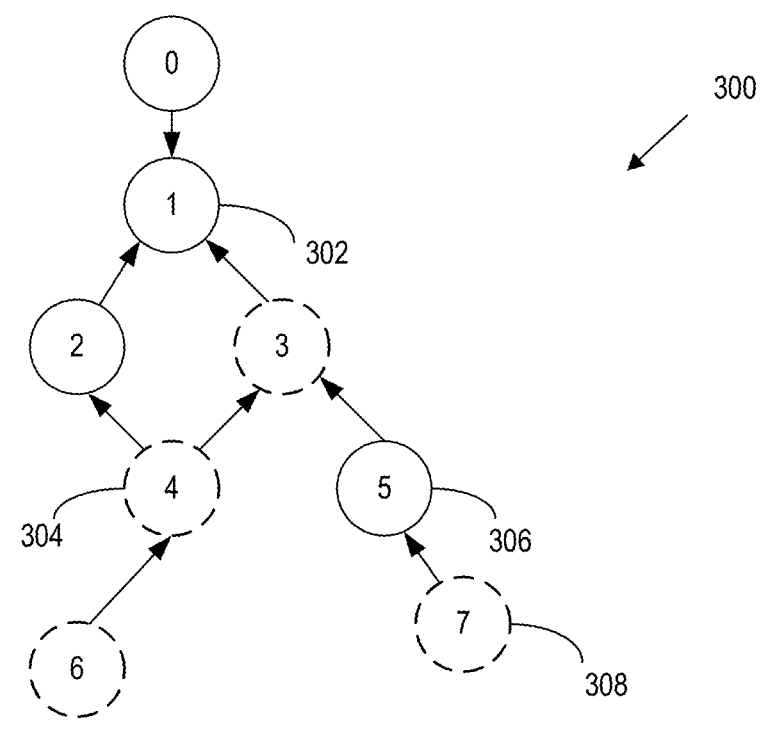
FIG. 3A shows a schematic of a command graph with head, branch, and merge commands indicated, in accordance with one or more implementations.

FIG. 3A shows a schematic (e.g., a graphical representation) of a command graph with head, branch, and merge commands indicated, in accordance with one or more implementations. The command graph 300 can represent the known commands 206, 208, 210 within data structure 200, and can represent the parent-child relationships of such commands. For example, the command graph 300 represents the command 306, which is a child command of a command with an identifier of "3" and a parent to the command 308, with an identifier of "7." Arrows within the command graph 300 can represent dependency of commands on other commands. The command graph 300 can be represented graphically or through any other data structure format (e.g., through the data structure 200). Head commands, branch commands, and merge commands within the command graph 300 are represented with dashed outlines.

A command with at least one command depending thereof can represent a parent command. For example, the command graph 300 can represent the command 302, with command identifier "1." Because multiple commands (e.g., Commands 2 and 3) depend on Command 1, Command 1 can be characterized as a branch command, in addition to a parent command. Moreover, because the command 304 (with identifier 4) depends on more than one command (e.g., Commands 2 and 3), the command 304 can represent a merge command. In situations where a command does not have known child commands depending thereof, a command may be a head command. For example, while the command 308 with identifier "7" has a parent command (e.g., the command 306 with identifier "5"), the command 308 does not have a known child command. In some implementations, head commands may be more likely to be recent, as information within these commands may not have been utilized yet.

Figure 3B:
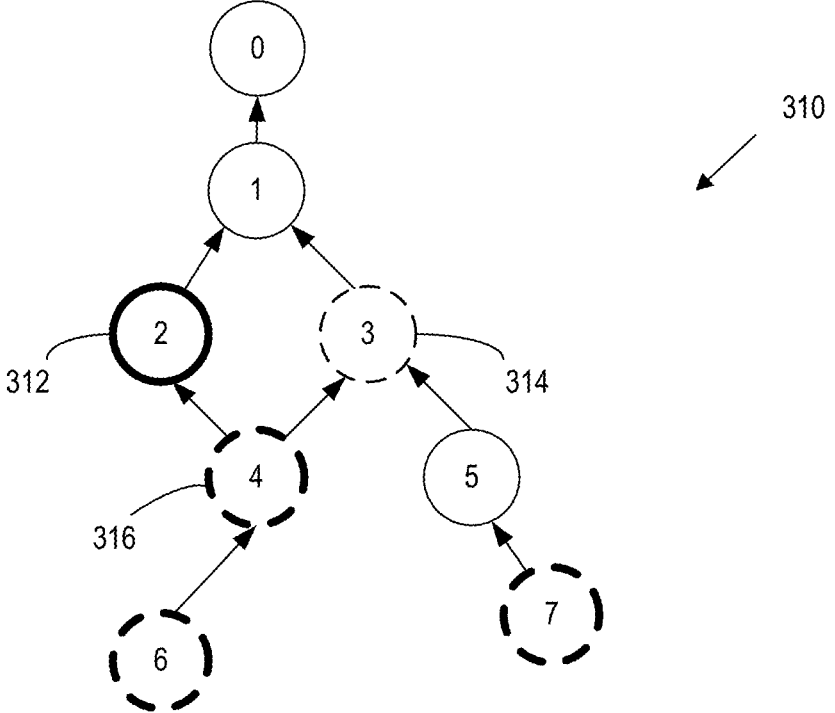
FIG. 3B shows a schematic of a command graph with sampled commands selected, in accordance with one or more implementations.

FIG. 3B shows a schematic of a command graph with sampled commands selected, in accordance with one or more implementations. For example, the command graph 310 includes indications of commands known to a given node that have been sampled for querying another node. As depicted in FIG. 3B, sampled commands are indicated by bold outlines, while commands with dashed outlines indicate commands that are head, branch, or merge commands. For example, the command 316 represents a merge command that has been included within a set of sampled commands. The command 312 represents a command that is not a known branch, merge, or head command but has been selected to be included within the set of sampled commands. In contrast, the command 314 represents a branch command that has not been selected to be within the set of sampled commands.

The disclosed systems can enable querying by a first node of other nodes for additional information relating to commands executed within the network, which may be unknown to the first node. In order to generate responses to queries that are likely to be useful and include information unknown to but relevant to the first node, the system can transmit a sample of commands known to the first node to other nodes. The system can utilize a sampling algorithm for the selection of these sampled commands.

The sampling algorithm can weigh or select certain commands over others based on, for example, the causal ordering, the parent-child relationships, or the priority associated with given commands. In some implementations, the sampling algorithm can utilize a probability distribution to select commands stochastically. As an illustrative example, the sampling algorithm emphasizes commands that are head commands, branch commands, or merge commands to varying degrees. In some implementations, the sampling algorithm can select commands determined to be head commands with precedence over another type of command. For example, because head commands may be more likely to be recent commands, the system can prioritize determination of commands associated with head commands over other commands. The system (e.g., via a first node of the network) can include an indication of this head command (e.g., a command identifier or a cryptographic hash thereof) in a request to a second node of the network for information relating to commands associated with this sampled head command. In response, in some implementations, the second node can transmit an indication of any children and/or parents associated with the sampled head command, enabling the first node to update its own command graph to include any new or previously unknown commands executed in relation to the head command.

In some implementations, the sampling algorithm can select commands based on priorities or causal ordering associated with each known command. In causal order, the parent-child relationship defines a causal graph for commands. This relationship communicates the intended sequencing of commands from a node that issues them. In priority order, when two commands (e.g., Command 4 and Command 5) share the same parent (e.g., the command 314), this creates a branch in the causal order of the graph. To provide a total order, a weave function can provide order to resolve ambiguous parent-child relationship sequences. For example, to create eventual consistency, the ordering of the nodes can be performed using a weave function that provides deterministic total ordering over commands. The weave function is a total ordering of the commands.

In causal order, the parent-child relationship defines a causal graph for commands. This "happens before" relationship communicates the intended sequencing of commands from the client that issues them. Causality is honored by a weave function. Specifically, the weave function does not order a command before any of the command's ancestors (e.g., parents). The causal order, though, is insufficient to provide a total order over a set of commands, e.g., when there is branching.

In priority order, when two commands share the same parent, this creates a branch in the causal order of the graph. The command can be known as a branch command. Such a branch can be resolved by using a merge command that has more than one parent. In this case there is no "happens before" relationship between commands on each side of the branch between the merge command and the first common ancestor. Trying to order the commands chronologically is difficult because the commands can be produced by disparate network devices whose local clocks are not synchronized to each other. In addition, establishing a global clock is not desirable because network devices can lose connectivity and can be unable to access the global clock. To provide a total order, the weave function can have a noncausal approach to ordering commands. As such, the system can assign commands with a priority value. The priority can be a 32-bit unsigned integer value used to order events that do not have a causal relationship. Based on the parent-child relationships and the priorities assigned to commands, the system can generate a causal order. The system can generate sampled commands on the basis of this causal order (e.g., by weighing commands at the end of the causal order sequence more heavily than those at the beginning).

Figure 4:
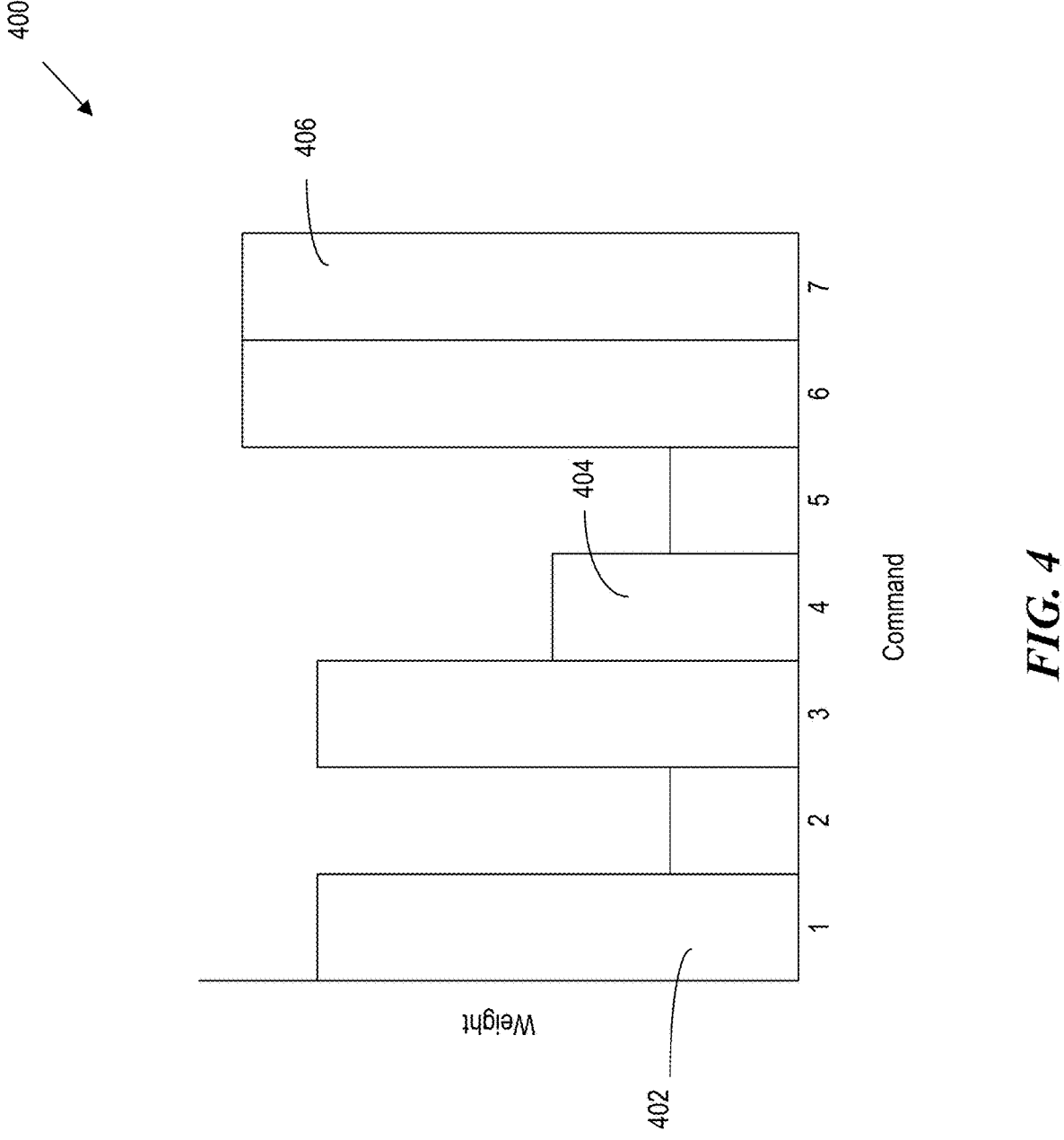
FIG. 4 shows a graph of a distribution of weights corresponding to a sampling algorithm, in accordance with one or more implementations.

FIG. 4 shows a graph of a distribution of weights corresponding to a sampling algorithm, in accordance with one or more implementations. For example, the graph 400 depicts commands (identified by command identifiers) on the x-axis, with corresponding weights depicted on the y-axis. A weight can include a numerical metric or indication of a likelihood that the sampling algorithm may select a given command. For example, a weight can include a percentage or another value. As an illustrative example, the system 100 may utilize a set of weights corresponding to a command, where the set of weights is proportional to a probability of selecting the corresponding command utilizing a probability distribution associated with the sampling algorithm. The probability of selecting a given command within the probability distribution can include a scaling of a weight corresponding to a given command divided by the sum of all weights assigned to commands within the command graph. The sampling algorithm can select a predetermined number of commands (e.g., to generate the set of sampled commands) based on the probability distribution defined by these scaled weights.

As an illustrative example, Command 1 (e.g., as represented by the command 302 in FIG. 3A) can be associated with a larger weight 402 than Command 4 (e.g., as represented by the command 304 in FIG. 3A, with a smaller weight 404). For example, the sampling algorithm may be such that branch commands are assigned larger weight than merge commands (e.g., Command 4). Furthermore, in some implementations, the sampling algorithm may assign larger weights to head commands than other types of commands. For example, Command 7 can be associated with the weight 406, which can be higher than other weights corresponding to branch-type, merge-type, or other commands.

Based on these weights, the system can construct a probability distribution. In some implementations, the probability distribution is such that the probability of selecting a given command is proportional to its corresponding assigned weight, as described above. As such, by prioritizing head, branch, and/or merge commands over other types of commands for sampling and subsequent querying of other nodes, the system enables nodes that are more likely to be used in subsequent commands to be queried and sampled, thereby improving the robustness of the querying process. As an illustrative example, head commands may be more likely to be recently executed. Thus, the system can ensure that the first node receives updates of commands that depend upon these recent commands by querying other nodes on the basis of presumptive head commands. If the second node possesses information relating to any child commands of the presumptive head command, such information can be transmitted to the first node to update the corresponding command graph, thereby providing targeted updating of more recent portions of the command graph.

Furthermore, by utilizing a probability distribution, the probability of sampling commands that are not head, branch, or merge commands can still be set to a non-zero value. As such, even older commands or commands that are not believed to be branch commands can be sampled and transmitted to a second node in a request for further information relating to commands. By doing so, the system can ensure that all connections and relationships represented within the command graph can be updated if warranted, even if older or previously irrelevant. Furthermore, by introducing variability in the sampled commands and used for querying other nodes for information, the system can ensure that previously transmitted commands are not repeatedly received by the system. For example, over time, the sets of sampled commands that are generated can vary probabilistically. Thus, commands that are returned by the second node to the first node in response to the request for information relating to the command graph may be varied as well, mitigating situations where the same commands are received from other nodes repeatedly.

Figure 5:
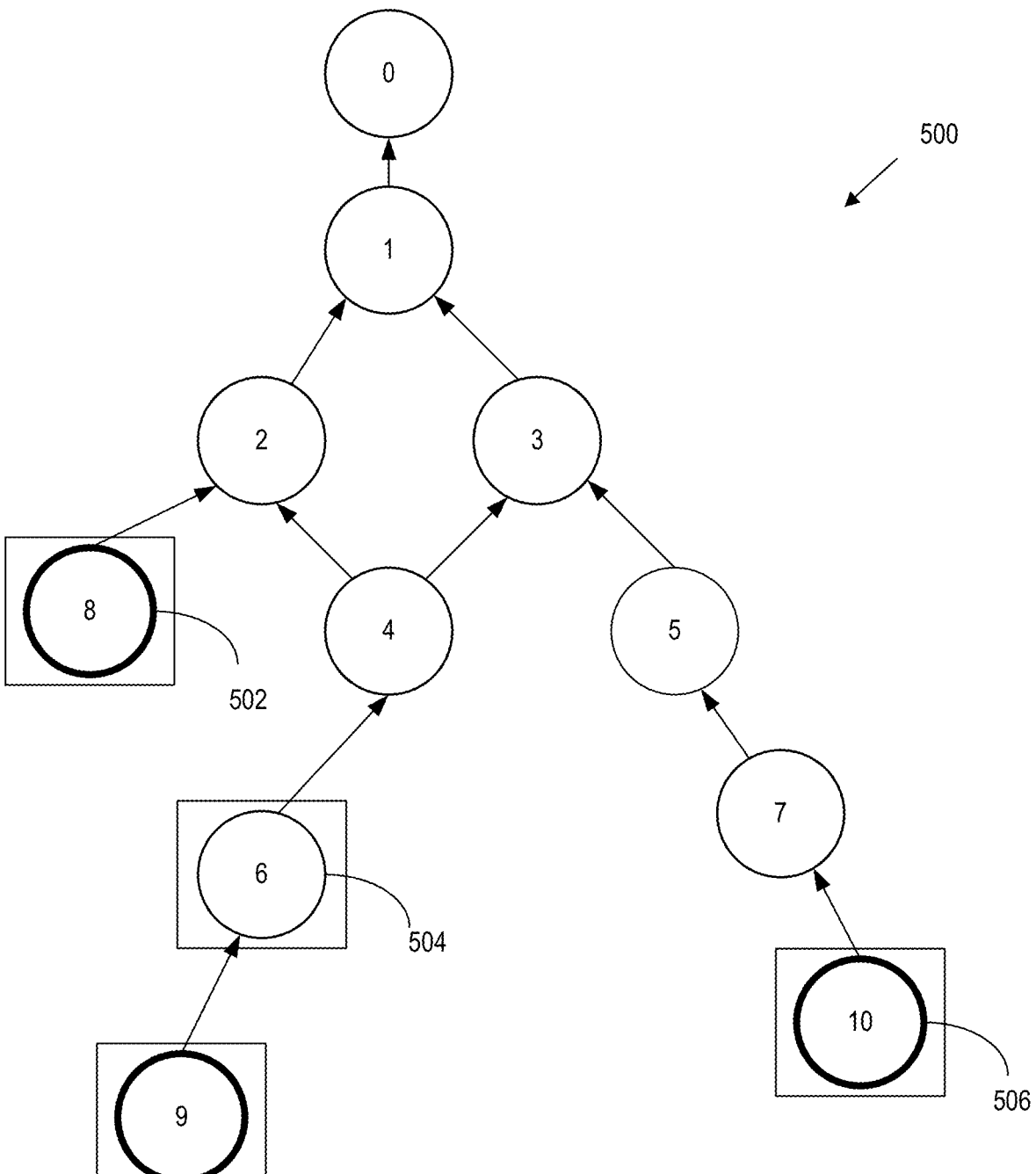
FIG. 5 shows a command graph that indicates commands received in response to requests for unknown commands, in accordance with one or more implementations.

FIG. 5 shows a command graph 500 that indicates commands received in response to requests for unknown commands, in accordance with one or more implementations. For example, in response to a first node sending a request for commands to a second node, the first node can receive indications of commands that are known to the second node. As an illustrative example, commands within boxes in FIG. 5 are received at a first node of the network from a second node in response to a request for commands, including commands 502, 504, and 506 (e.g., with identifiers "8," "6," and "10," respectively).

In some implementations, the first node can request information relating to potentially unknown commands, for completion of the first node's command graph. The request can include the set of sampled commands (e.g., as sampled using the sampling algorithm and/or the probabilistic distribution). In response to the request, the second node can include indications of commands that are associated with the sampled commands. For example, in some implementations, the first node can receive an indication of a child command for each sampled command in the set of sampled commands if the corresponding child command exists. The indications of the commands received from the second node can include command identifiers of these commands, as well as indications of parent-child relationships (e.g., identifiers of the corresponding parent command). In some implementations, this response can be a fixed-size message, of the same or a different size as the request.

As an illustrative example, a command sampled by the sampling algorithm can include Command 2 (e.g., the command 312, as shown on FIG. 3B). The first node can transmit this indication of the command 312 to the second node as a query for further information relating to other commands that may not be known to the first node (e.g., due to unreliability of communications or data storage). In response, the second node can reference its own command graph. For example, the second node can identify whether any of the indications of the sampled commands correspond to commands known to the second node. Based on identifying these commands, the second node can determine whether any of these commands have associated child commands. The second node can choose a predetermined number of these child commands to identify and transmit back to the first node in response to the first node's request. In some implementations, the second node can choose non-child commands of the sampled commands (in addition to or instead of child commands), such as parent commands or sibling commands (e.g., child commands of the parent command).

The first node can determine whether the commands received from the second node are already known (e.g., are already represented on the command graph). For example, the first node can determine that the command 504 (e.g., Command 6 on FIG. 5) was already known to the first node. Based on this determination, the system can determine not to append an indication of this known command to the command graph to prevent duplicate additions. In some implementations, the system 100 can determine that a command received from the second node is not previously known. For example, the system can determine that Commands 8, 9, and 10 shown on FIG. 5, including the commands 502 and 506 (in bold), have not been previously known. The system can append these commands to the graph based on this determination.

As an illustrative example, the first node can receive indications of previously unknown commands that are associated with parent commands that were previously thought to be head commands. For example, an indication of the command 506, with identifier "10," can be received from the second node and appended to the corresponding parent command with identifier "7" (e.g., as identified within the response from the second node). By including this indication within the set of known commands and the command graph, the first node receives information relating to a command executed within the network that was previously unknown, thereby incrementally completing or updating the command graph based on information possessed by the second node.

In some embodiments, the first node can receive indications of previously unknown commands that are child commands to known commands but were not head, branch, or merge commands. For example, based on including Command 2, as shown on FIG. 5, within the set of sampled commands transmitted to the second node, the first node can receive a corresponding child command (e.g., the command 502 representing Command 8), where the child command was previously unknown. Thus, by sampling commands that are not known to be head, branch, or merge commands, the system can receive indications of commands that may have been missed previously, even if the likelihood of finding such commands is low. As such, the system enables updating command graphs holistically, in all regions of the command graph, even if these received commands are not associated with the most recent or relevant commands.

FIG. 6 shows a flowchart 600 of a method to iteratively complete command graphs based on stochastic sampling of known commands, in accordance with one or more implementations. One or more hardware or software processors executing instructions described in this application (e.g., associated with a first node of a network) can, in operation 602, obtain a sampling algorithm for selecting sample commands from a set of known commands. The known commands within the set of known commands can be represented through a command graph, which may be graphical or represented through data structures (e.g., data structure 200). The sampling algorithm can include a protocol for selecting sampled commands and, in some implementations, the processor can generate and/or use a probability distribution, where each command is assigned a probability proportional to a corresponding weight. As an illustrative example, the processor can utilize the sampling algorithm to sample head-type, branch-type, or merge-type commands over other commands. By sampling commands known to the first node probabilistically, the processors enable holistic and targeted generation of queries for receiving further commands that may be unknown at the first node.

In operation 604, the processors can determine a set of sampled commands based on the sampling algorithm. For example, the set of sampled commands can include a predetermined number of sampled commands. The processors can sample the command graph associated with the first node for commands according to the sampling algorithm, for subsequent transmission to a second node in the form of a request or a query for further information relating to commands known to devices within the network. By doing so, the system can generate a query that requests information targeted at commands of interest, such as branch, head, or merge commands.

In some implementations, the processors can determine the set of sampled commands based on causal ordering or assigned priorities associated with the known commands. For example, the processors can determine a set of parent-child relationships for the set of known commands, wherein each parent-child relationship of the set of parent-child relationships indicates a corresponding link between a first and second command of the set of known commands. The system can obtain a set of priorities and a set of identifiers, wherein each priority of the set of priorities is associated with a corresponding known command of the set of known commands. Each identifier of the set of identifiers can be associated with the corresponding known command of the set of known commands. The processors can generate a causal ordering based on the set of parent-child relationships, the set of priorities, and the set of identifiers. The processors can determine the set of sampled commands based on the causal ordering. As an illustrative example, the sampling algorithm for selecting the set of sampled commands can consider the order in which the commands have been arranged (e.g., through causal ordering, considering both priority and parent-child relationships). For example, the sampling algorithm can sample more recent commands (e.g., commands that are at the end of a causal or priority-based ordering) more heavily than commands that are less recent. By doing so, the system can generate queries for completion of the command graph that are more relevant or likely to require updating, thereby improving the efficiency of command graph completion.

In some implementations, the processors can determine the set of sampled commands based on parent-child relationships within the set of known commands. For example, the processors can determine a set of parent-child relationships for the set of known commands, wherein each parent-child relationship of the set of parent-child relationships indicates a corresponding link between a first and second command of the set of known commands. Based on the set of parent-child relationships, the processors can determine a subset of known commands, wherein the subset of known commands includes head commands and branch commands. The branch commands can include the known commands with at least two child commands. The head commands can include the known commands with no known child commands. The processors can determine the set of sampled commands from the subset of known commands. As an illustrative example, the sampling algorithm used by the processors to select the set of sampled commands can prioritize known commands with more complex relationships with other commands, such as branch commands. Additionally or alternatively, the sampling algorithm can prioritize known commands with no known child commands, as these commands may be more likely to be recent and, therefore, associated with new, dependent child commands that were previously unknown. In some implementations, the sampling algorithm can determine commands that are merge commands (e.g., dependent on more than one parent command) and include these commands for the sampling algorithm's consideration. By doing so, the system affords improved control and targeting in the queries sent to other nodes for completion of the command graph.

In some embodiments, the processors can generate a probability distribution based on assigning weights to commands, such as based on the commands' types. For example, based on the set of parent-child relationships, the processors can determine that a first known command of the set of known commands is of a branch type, where a command of the branch type is a parent to two or more child commands of the set of known commands. The processors can determine a first weight of the first known command, where the first weight is greater than a second weight corresponding to a known command of the set of known commands that is not of the branch type. The processors can generate the set of sampled commands to include the first known command, where the first known command was selected using the sampling algorithm with a probability proportional to the first weight. As an illustrative example, the system can determine that a first command of the known commands is a branch command, while a second command of the known commands is not a branch command. The processors can assign a quantitative weight to the first command that is larger (e.g., double) the weight for the second command.

In disclosed implementations, the processors can generate a first probabilistic distribution for the set of known commands based on a set of weights (e.g., as determined above) and utilize this probabilistic distribution to select the sampled commands. For example, based on the first probabilistic distribution, the processors can select commands from the set of known commands to generate the set of sampled commands. For example, the processors can generate a probability distribution based on weights. A weight corresponding to a first known command can be divided by the total sum of weights assigned to all known commands to generate a fractional probability of selecting the first known command. By carrying out this operation for all known commands within the set of known commands, the processors can generate the probability distribution and, for example, select a predetermined number of these known commands according to these generated probabilities. The processors can select the set of sampled commands such that the probability of selecting the first command is, consequently, proportionally larger than the probability of selecting the second command. As such, the system enables targeted selections of commands that may be more likely to be associated with new or unknown commands.

In disclosed implementations, the processors can determine the set of sampled commands based on including known head commands within the set of sampled commands. For example, the processors can determine a subset of known commands, where the subset of known commands includes head commands that are not parents of other known commands of the set of known commands. The processors can generate the set of sampled commands to include the subset of known commands. By including head commands within the set of sampled commands, the system can ensure that any commands without child commands can be checked for any unknown dependent commands. By doing so, the system can focus on commands that may be more likely to be associated with other dependent commands, which improves the efficiency of completing the command graph.

In operation 606, the processors can transmit a first request for completing a command graph. For example, the processors can transmit, to a node of the system, a first request for completing the command graph, where the first request comprises the set of sampled commands. As an illustrative example, the processors can generate a data structure (e.g., a fixed-size message) that includes indications of the sampled commands. In some implementations, these indications can include identifiers of the commands (e.g., a cryptographic hash of a command identifier). In some implementations, the processors can determine indications of expected or believed parent-child relationships between the sampled commands and other known commands and include these indications within the first request. By doing so, the disclosed system enables querying of other nodes within the network for information relating to commands that may be yet unknown to the first node (e.g., the node associated with the processors). By providing a sample of commands known to the first node, the processors provide information that can aid in determination of which commands are likely not known to the first node.

In some implementations, the first request can be of a fixed message size. Additionally or alternatively, the first request can indicate a desired message size for the requested response. For example, the processors can determine a fixed message size, where the fixed message size indicates a requested file size for communications from the node. The processors can generate the first request to include an indication of the fixed message size. As an illustrative example, a first node can request that a second node respond to the first request with a message of a maximum or fixed file size (e.g., as expressed in bytes). In some implementations, the fixed size can include an indication of a particular number of data fields (e.g., a number of indications of commands, the corresponding parent commands, and/or the corresponding child commands). Thus, the first node can specify bandwidth or communication limitations and notify the second node of these limitations, which can aid in situations where communications may be limited or impaired. As such, communications can be short and satisfy any imposed bandwidth limitations, improving the robustness and reliability of command graph completion.

In operation 608, the processors can receive a second command based on the first request. For example, the processors can, based on the first request, receive a second command, where the second command comprises an indication of at least one parent command of the second command. As an illustrative example, the system can receive a data structure listing indications of a command known to the second node that is associated with at least one of the sampled commands. For example, the commands known to the second node that are received at the first node can include identifiers of a child command, where the child command is a child to one of the sampled commands. In some implementations, one or more parents of the child command can be indicated within the transmission from the second node. Thus, the processors can receive information relating to commands, as well as their relationships to other commands that may be already known and represented on the command graph.

In operation 610, the processors can append the second command to the command graph. For example, the processors can append the second command to the command graph based on an indication of the at least one parent command. As an illustrative example, the processors can determine whether received commands from a node in the system correspond to a command of the set of known commands. If the second command, received from the node of the network in response to the first request, is not a known command, the processors can determine at least one parent command associated with the second command. In some implementations, the at least one parent command can be included along with the received command. The processors can generate an indication of a link between the second command and a known command, if this known command is determined to correspond to the parent command of the second command. By doing so, the system can complete the command graph on the basis of commands received from other nodes within the network.

In some implementations, the processors can append the second command to the command graph based on determining parent-child relationships for the second command. For example, the processors can determine a first parent command for the second command based on the indication of the at least one parent command, wherein the first parent command is included in the set of known commands. The processors can identify a first representation of the first parent command on the command graph. The processors can generate a second representation of the second command on the command graph. The processors can generate a first indication of a first parent-child relationship between the first representation and the second representation. For example, the parent-child relationship can be stored as a pair of command identifiers within the data structure 200 to represent this relationship on the command graph. By generating this first indication, the processors record relationships between these commands and, as such, provide information for construction of the command graph.

In some implementations, the processors can determine that the second command has multiple parent commands and generate an indication of the corresponding parent-child relationship for filling in the command graph. For example, the processors can determine a second parent command for the second command based on the indication of the at least one parent command, wherein the second parent command is included in the set of known commands. The processors can identify a third representation of the second parent command on the command graph. The processors can generate a second indication of a second parent-child relationship between the third representation and the second representation while preserving the first indication of the first parent-child relationship. As an illustrative example, the processors can determine that the second command received from another node in the network is a merge command and, as such, includes more than one distinct parent command. Based on this determination, the processors can generate an indication of more than one of these parent-child relationships. By doing so, the system enables accurate representations of causal relationships between various commands within the command graph, even for commands that were previously unknown.

In some implementations, the processors can receive an indication from other nodes within the network that there are further commands for transmission to the first node or the processors. For example, the processors can generate the second command in the set of known commands. The processors can receive an indication that the node includes a third command for transmission, wherein the third command is unknown. Based on the indication, the processors can transmit, to the node, a second request for the third command. Based on the second request, the processors can receive the third command. The processors can append the third command to the command graph based on a third identifier of the third command. As an illustrative example, the node (e.g., the second node) responding to the request for completion of the command graph may have transmission restrictions (e.g., a fixed message size restriction). As such, the second node can generate an indication that there is further information that could aid the first node in completion of the corresponding command graph. In some implementations, the indication can include information relating to the size, amount, or nature of further information that could be provided to the first node. Based on receiving this indication, the first node can request this additional information and receive the information in response if no communication or bandwidth issues are detected, thereby enabling efficient completion of the command graph, while staying sensitive to any possible communication failures or bandwidth limitations.

In some implementations, commands can be stored within storage media according to their sequence through the use of sequential labels. For example, the processors can generate a set of labels for the set of known commands, where each label of the set of labels indicates a corresponding sequential position of a corresponding known command of the set of known commands. Based on the set of labels, the processors can store each known command of the set of known commands in a storage disk, where each known command is stored in an order based on a corresponding label of the set of labels. In some implementations, the storage disk can include any storage medium of any shape, form, or configuration. By storing known commands as such, the system can improve the efficiency of retrieval or storage of known commands, thereby improving the efficiency of sampling commands and generating the requests for further information that can aid in completion of the corresponding command graph.

From the foregoing, it will be appreciated that specific embodiments of the invention have been described herein for purposes of illustration, but that various modifications may be made without deviating from the scope of the invention. Accordingly, the invention is not limited except as by the appended claims.

Computer System

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer (SBC) system, or a distributed system such as a mesh of computer systems, or can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726, a storage disk, or a storage medium) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system for iteratively completing command graphs based on sampling of known commands, the system comprising:

a first node associated with at least one hardware processor, wherein the first node is configured to communicate fixed-size messages to a second node; and at least one non-transitory memory storing instructions, which, when executed by the at least one hardware processor, cause the system to:

obtain a sampling algorithm for selecting sample commands from a set of known commands represented by a command graph, wherein the sampling algorithm indicates a protocol for selecting the sample commands with a first probabilistic distribution;

determine a set of sampled commands based on a subset of the known commands, wherein the subset of the known commands comprises head commands and branch commands, wherein the branch commands include the known commands with at least two child commands, and wherein the head commands include the known commands with no known child commands;

transmit, to the second node, a first request for completing the command graph associated with the first node, wherein the first request comprises the set of sampled commands;

based on the first request, receive a second command, wherein the second command comprises an indication of at least one parent command of the second command; and append the second command to the command graph based on an indication of the at least one parent command.

2. The system of claim 1, wherein the instructions for obtaining the sampling algorithm cause the system to:

determine a set of parent-child relationships for the set of known commands, wherein each parent-child relationship of the set of parent-child relationships indicates a corresponding link between a first and second command of the set of known commands;

obtain a set of priorities and a set of identifiers, wherein each priority of the set of priorities is associated with a corresponding known command of the set of known commands, and wherein each identifier of the set of identifiers is associated with the corresponding known command of the set of known commands;

generate a causal ordering based on the set of parent-child relationships, the set of priorities, and the set of identifiers; and determine the set of sampled commands based on the causal ordering.

3. The system of claim 2, wherein the instructions for determining the set of sampled commands based on the causal ordering cause the system to:

based on the set of parent-child relationships, determine that a first known command of the set of known commands is of a branch type, wherein a command of the branch type is a parent to two or more child commands of the set of known commands;

determine a first weight of the first known command, wherein the first weight is greater than a second weight corresponding to a known command of the set of known commands that is not of the branch type; and generate the set of sampled commands to include the first known command, wherein the first known command was selected using the sampling algorithm with a probability proportional to the first weight.

4. The system of claim 2, wherein the instructions for determining the set of sampled commands based on the subset of the known commands cause the system to:

generate the first probabilistic distribution for the set of known commands based on a set of weights; and based on the first probabilistic distribution, select commands from the set of known commands to generate the set of sampled commands.

5. The system of claim 1, wherein the instructions for appending the second command to the command graph cause the system to:

determine a first parent command for the second command based on the indication of the at least one parent command, wherein the first parent command is included in the set of known commands;

identify a first representation of the first parent command on the command graph;

generate a second representation of the second command on the command graph; and generate a first indication of a first parent-child relationship between the first representation and the second representation.

6. The system of claim 5, wherein the instructions for appending the second command to the command graph cause the system to:

determine a second parent command for the second command based on the indication of the at least one parent command, wherein the second parent command is included in the set of known commands;

identify a third representation of the second parent command on the command graph; and generate a second indication of a second parent-child relationship between the third representation and the second representation while preserving the first indication of the first parent-child relationship.

7. The system of claim 1, wherein the instructions for determining the set of sampled commands based on the subset of the known commands cause the system to:

determine the subset of the known commands, wherein the subset of the known commands includes head commands that are not parents of other known commands of the set of known commands; and generate the set of sampled commands to include the subset of known commands.

8. A non-transitory, computer-readable storage medium comprising instructions recorded thereon that, when executed by at least one processor of a system, cause the system to:

obtain a sampling algorithm for selecting sampled commands from a set of known commands represented by a command graph, wherein the sampling algorithm indicates a protocol for selecting the sampled commands;

determine a set of sampled commands based on a probabilistic distribution of the sampling algorithm, wherein the set of sampled commands comprises a predetermined number of sampled commands;

wherein the subset of known commands comprises head commands and branch commands, wherein the branch commands include the known commands with at least two child commands, and wherein the head commands include the known commands with no known child commands;

transmit, to a node of the system, a first request for iteratively completing the command graph, wherein the first request comprises the set of sampled commands;

based on the first request, receive a second command, wherein the second command comprises an indication of at least one parent command of the second command; and append the second command to the command graph based on an indication of the at least one parent command.

9. The non-transitory, computer-readable storage medium of claim 8, wherein the instructions for obtaining the sampling algorithm cause the system to:

determine a set of parent-child relationships for the set of known commands, wherein each parent-child relationship of the set of parent-child relationships indicates a corresponding link between a first and second command of the set of known commands;

obtain a set of priorities and a set of identifiers, wherein each priority of the set of priorities is associated with a corresponding known command of the set of known commands, and wherein each identifier of the set of identifiers is associated with the corresponding known command of the set of known commands;

generate a causal ordering based on the set of parent-child relationships, the set of priorities, and the set of identifiers; and determine the set of sampled commands based on the causal ordering.

10. The non-transitory, computer-readable storage medium of claim 8, wherein the instructions for obtaining the sampling algorithm cause the system to:

determine a set of parent-child relationships for the set of known commands, wherein each parent-child relationship of the set of parent-child relationships indicates a corresponding link between a first and second command of the set of known commands; and based on the set of parent-child relationships, determine the set of sampled commands from the subset of known commands.

11. The non-transitory, computer-readable storage medium of claim 8, wherein the instructions for determining the set of sampled commands based on the sampling algorithm cause the system to:

based on the set of parent-child relationships, determine that a first known command of the set of known commands is of a branch type, wherein a command of the branch type is a parent to two or more child commands of the set of known commands;

determine a first weight of the first known command, wherein the first weight is greater than a second weight corresponding to a known command of the set of known commands that is not of the branch type; and generate the set of sampled commands to include the first known command, wherein the first known command was selected using the sampling algorithm with a probability proportional to the first weight.

12. The non-transitory, computer-readable storage medium of claim 8, wherein the instructions for determining the set of sampled commands based on the sampling algorithm cause the system to:

generate a first probabilistic distribution for the set of known commands based on a set of weights; and based on the first probabilistic distribution, select commands from the set of known commands to generate the set of sampled commands.

13. The non-transitory, computer-readable storage medium of claim 8, wherein the instructions for appending the second command to the command graph cause the system to:

determine a first parent command for the second command based on the indication of the at least one parent command, wherein the first parent command is included in the set of known commands;

identify a first representation of the first parent command on the command graph;

generate a second representation of the second command on the command graph; and generate a first indication of a first parent-child relationship between the first representation and the second representation.

14. The non-transitory, computer-readable storage medium of claim 13, wherein the instructions for appending the second command to the command graph cause the system to:

determine a second parent command for the second command based on the indication of the at least one parent command, wherein the second parent command is included in the set of known commands;

identify a third representation of the second parent command on the command graph; and generate a second indication of a second parent-child relationship between the third representation and the second representation while preserving the first indication of the first parent-child relationship.

15. The non-transitory, computer-readable storage medium of claim 8, wherein the instructions for determining the set of sampled commands based on the sampling algorithm cause the system to:

determine a subset of known commands, wherein the subset of known commands includes head commands that are not parents of other known commands of the set of known commands; and generate the set of sampled commands to include the subset of known commands.

16. The non-transitory, computer-readable storage medium of claim 8, wherein the instructions cause the system to:

determine a fixed message size, wherein the fixed message size indicates a requested file size for communications from the node; and generate the first request to include an indication of the fixed message size.

17. The non-transitory, computer-readable storage medium of claim 8, wherein the instructions cause the system to:

generate the second command in the set of known commands;

receive an indication that the node includes a third command for transmission, wherein the third command is unknown;

based on the indication, transmit, to the node, a second request for the third command;

based on the second request, receive the third command; and append the third command to the command graph based on a third identifier of the third command.

18. The non-transitory, computer-readable storage medium of claim 17, wherein the instructions cause the system to:

generate a set of labels for the set of known commands, wherein each label of the set of labels indicates a corresponding sequential position of a corresponding known command of the set of known commands; and based on the set of labels, store each known command of the set of known commands in a storage disk, wherein each known command is stored in an order based on a corresponding label of the set of labels.

19. A method performed by a first node of a system, the method comprising:

obtaining a sampling algorithm for selecting sample commands from a set of known commands represented by a command graph, wherein the sampling algorithm indicates a protocol for selecting the sample commands with a first probabilistic distribution;

determining a set of sampled commands based on a probabilistic distribution of the sampling algorithm, wherein the set of sampled commands includes head commands and branch commands of the set of known commands, wherein the branch commands include the known commands with at least two child commands, and wherein the head commands include the known commands with no known child commands;

transmitting, to a second node of the system, a first request for iteratively completing the command graph, wherein the first request comprises the set of sampled commands;

based on the first request, receiving a second command, wherein the second command comprises an indication of at least one parent command of the second command; and appending the second command to the command graph based on the indication of the at least one parent command.

20. The method of claim 19, wherein determining the set of sampled commands comprises:

determining a set of parent-child relationships for the set of known commands, wherein each parent-child relationship of the set of parent-child relationships indicates a corresponding link between a first and second command of the set of known commands;

obtaining a set of priorities and a set of identifiers, wherein each priority of the set of priorities is associated with a corresponding known command of the set of known commands, and wherein each identifier of the set of identifiers is associated with the corresponding known command of the set of known commands;

generating a causal ordering based on the set of parent-child relationships, the set of priorities, and the set of identifiers; and determining the set of sampled commands based on the causal ordering.

* * * * *